United States Patent [19]
Henry et al.

[11] Patent Number: 6,152,653
[45] Date of Patent: Nov. 28, 2000

[54] GEOCOMPOSITE CAPILLARY BARRIER DRAIN

[76] Inventors: Karen S. Henry, 330 River Rd., Lyme, N.H. 03768; John C. Stormont, 5501 Kettle Rd. NW., Albuquerque, N. Mex. 87120

[21] Appl. No.: 09/134,531

[22] Filed: Aug. 14, 1998

[51] Int. Cl.[7] .................................. B09B 1/00; G21F 9/00
[52] U.S. Cl. ......................... 405/128; 405/52; 405/129; 588/259; 210/170; 210/747
[58] Field of Search ........................... 405/52, 128, 129; 588/259; 210/170, 747

[56] References Cited

U.S. PATENT DOCUMENTS

| | | | |
|---|---|---|---|
| 4,166,709 | 9/1979 | Valiga | 405/128 |
| 4,543,016 | 9/1985 | Tallard | 405/129 X |
| 4,768,897 | 9/1988 | Nussbaumer et al. | 405/128 |
| 4,784,802 | 11/1988 | Mallory et al. | 405/129 X |
| 5,061,119 | 10/1991 | Balthaus et al. | 405/128 |
| 5,183,355 | 2/1993 | Treat et al. | 405/128 |
| 5,259,697 | 11/1993 | Allen et al. | 405/129 |
| 5,295,763 | 3/1994 | Stenborg et al. | 405/129 |
| 5,372,459 | 12/1994 | Prange et al. | 405/129 |
| 5,550,315 | 8/1996 | Stormont | 588/259 |
| 5,564,864 | 10/1996 | Simpson et al. | 405/129 X |

*Primary Examiner*—Eileen D. Lillis
*Assistant Examiner*—Jong-Suk Lee
*Attorney, Agent, or Firm*—Luther Marsh; John A. MacEvoy

[57] ABSTRACT

A geotechnical structure that includes a first body of soil having a first unsaturated concentration of moisture. There is also a second body of soil, which includes a second unsaturated concentration of moisture that is different from the first concentration. A moisture barrier is interposed between the first body of soil and the second body of soil. The moisture barrier includes an upper and lower layer that draw water laterally. A medial capillary barrier layer prevents traverse moisture migration between the first and second bodies of soil. Moisture migration both upwardly and downwardly is thus prevented, and water in the first and second bodies of unsaturated soil is drained laterally to reduce pore water pressures in the first and second bodies of soil.

23 Claims, 1 Drawing Sheet

GEOCOMPOSITE CAPILLARY BARRIER DRAIN

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to structures for the containment of waste and more particularly to barriers used in such structures. It also relates to the drainage of, and the reduction of frost heave in, pavement and other geotechnical structures.

2. Brief Description of the Prior Art

As increasing amounts of municipal and other wastes are disposed of in landfills, a need has become apparent to reduce or eliminate the infiltration of water into such landfills. One approach to reducing the infiltration of water is disclosed in U.S. Pat. No. 5,550,315 to Stormont, the contents of which are incorporated herein by reference. This patent discloses a system in which waste sites are capped or covered upon closure. The cover structure incorporates a number of different layers each having a contributory function. One such layer is the barrier layer. Traditionally, the barriers have been compacted soil and geosynthetics. These types of barriers have not been successfully implemented in unsaturated ground conditions like those found in dry climates.

A Capillary barriers have been proposed as barrier layers in dry environments, but the diversion length of these barriers has been found to be inadequate. An alternative to the capillary barrier is an anisotropic capillary barrier. An anisotropic capillary barrier has an increased diversion length, which results in more water being diverted laterally, thereby preventing the majority of water from percolating in a downward direction through the barrier. Number of drawbacks, however, may attend the use of the Stormont system. That is, the barrier used in the Stormont system limits water flow downwardly, but there is no means for the lateral drainage of water moving upward. The Stormont system is used to dirvert infiltrating water, but not as a drain for unsaturated soils noras an integral part means of reducing pore water pressure in the overlying or underlying soils nor the purpose of reducing frost heave in the overlying soil.

A need, therefore, exists for a geotechnical structure with a moisture barrier that limits water flow not only downwardly, but also upwardly, and to provide lateral drainage of unsaturated soils overlying and underlying the barrier.

SUMMARY OF THE INVENTION

In the structure of this invention, a barrier called a geosynthetic capillary barrier drain is used. This barrier is used to remove liquid, which is usually water, from soils, even when the soils are unsaturated. This barrier is also used in preventing migration of liquid from one unsaturated body of soil to another body of soil. The geocomposite capillary barrier drain preferably consists of two geosynthetics, which may be bound together to form one barrier. One geosynthetic, the first transport layer, has unsaturated hydraulic conductivity values greater than the second capillary barrier layer. The first transport layer transports water in the plane of the material, while the capillary barrier layer prevents cross-plane flow. The transport layer could be composed of any synthetic materials including but not limited to polyester, polypropylene, fiberglass, etc. and it may also include granular material such as soil. When the geocomposite capillary barrier drain is placed on a slope with the transport layer on top, water is drained laterally in the transport layer due to gravity.

The structure of the present invention may be used in landfills, pavement systems, reinforced slopes and walls and other geotechnical structures to help drain water or other liquid from soil even when the soil is not saturated. It may also be used to prevent migration of liquid across the capillary barrier layer. In an example of landfill capping, it could be placed within soil, sloping or curved downwardly, with the transport layer on top and connected to a drainage system or daylighted to atmosphere that will carry excess water away. The transport layer will move water out of the soil with which it is in contact. The capillary barrier layer will significantly reduce the migration of water across the geosynthetic layer from below the capillary barrier to above it. Freezing or evaporation typically induces this migration.

It is possible that each geosynthetic layer will consist of a geotextile. However, each layer may consist of other geosynthetics. For example, the transport layer could consist of soil particles dispersed within a geotextile, while a large-pored drainage net sandwiched by geotextiles could form the capillary barrier layer.

BRIEF DESCRIPTION OF THE DRAWINGS

Other objects, features and advantages of the present invention will become apparent upon reference to the following description of the preferred embodiments and to the drawing, wherein corresponding reference characters indicate corresponding parts in the drawing and wherein.

DETAILED DESCRIPTION OF THE PREFERRED EMBODIMENT

Figure 1:
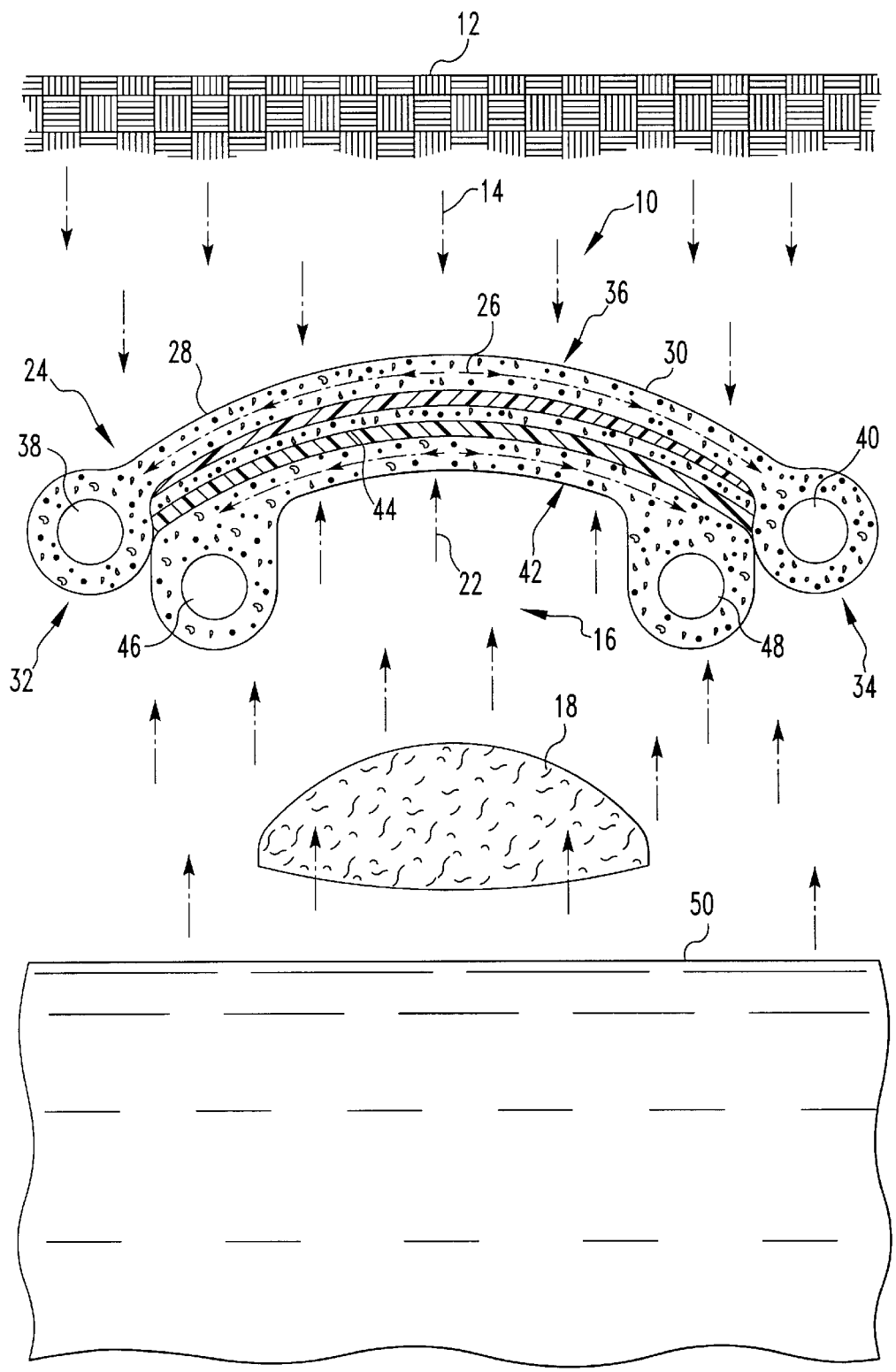
FIG. 1 is a cross sectional schematic view of a geotechnical structure including a geosynthetic capillary barrier drain representing a preferred embodiment of the present invention.

Referring to the drawing, the geotechnical structure of the present invention includes a first body of soil 10 that is positioned beneath the ground surface 12. Water from the ground surface 12 results in downwardly infiltrating water 14. The structure also includes a second body of soil 16 that covers buried waste 18. This second body of soil 16 is positioned above a water table 50, and there may be upwardly migrating water 22. Interposed between the first body of soil 10 and the second body of soil 16 there is a barrier 24. This barrier is arcuately shaped or sloped and has an upper area 26 and opposed sloped sides 28 and 30. Lower terminal ends 32 and 34 are positioned respectively at the base of the sloped sides 28 and 30. Preferably the slopes of these sides 28 and 30 will be from about 1° to about 40°. The barrier has an upper first transport layer 36. At the lower terminal ends 32 and 34 of the transport layer 36 there are respectively drains 38 and 40. The barrier also includes a lower second transport layer 42. A medial capillary barrier third layer 44 is also interposed between the upper transport layer 36 and lower transport layer 42. The unsaturated hydraulic conductivity of the transport layers 36 and 42 is greater than the unsaturated hydraulic conductivity of the medial capillary barrier 44. At the lower terminal ends of the lower transport layer there are drains 46 and 48. The second body of soil 16 is superimposed over a water table 50.

The first and second layers 36 and 42 have unsaturated hydraulic conductivities which may be the same or different and which are preferably in the range of from about $1 \times 10^{-6}$ m sec$^{-1}$ to about $1 \times 10^{-2}$ m sec$^{-1}$. The third medial capillary barrier layer 44 has a lower unsaturated hydraulic conductivity that the first and second transport layers 36 and 42, which is in the range of from about 0 to about $1 \times 10^{-6}$ m sec$^{-1}$ and has an entry suction of from about −500 mm of water to about 500 mm of water. The first and second transport layers 36 and 42 each preferably have a thickness of from about 0.5 mm to about 50 mm. The medial capillary barrier third layer 44 preferably has a thickness of from about 1 mm to about 100 mm.

Water enters a porous material when the water is in a state of suction (negative water pressure) known as the water entry suction. The water entry suction is a characteristic of the porous material, and is influenced by the pore sizes and wetting properties of the pore walls. Measuring the capillary rise of water in the material can approximate the water entry suction of a porous material, expressed as a head of water.

When downward moving water in soil encounters dipping layers of material that has a water entry suction value lower than the state of suction of the water, the water will flow along the interface, i.e., lateral drainage occurs. The underlying layer with a relatively low water entry suction value (a positive water pressure might even be required) is called a capillary barrier. Water accumulates near the soil-capillary barrier interface and flows down dip. The unsaturated drainage of soils can be greatly improved by placing a transport layer between the overlying soil and the underlying capillary barrier. The transport layer would have a water entry suction higher than the water entry suction of the capillary barrier, so that it would more easily accept water from unsaturated soil. As long as the water in the transport layer is in a higher degree of suction than the water entry suction value of the capillary barrier, water will not migrate into or across the underlying capillary barrier. Furthermore, if the transport layer is conductive at typical values of soil moisture suction, then water will drain laterally along the slope by gravity. Similarly, if the capillary barrier is placed above the water table at a distance such that the water in the capillary fringe that reaches it is at suctions higher than the water entry suction of the capillary barrier, water will not rise into the capillary barrier. Thus, the geocomposite suction drain can prevent water from an underlying soil body from migrating into the overlying soil body that may be induced by capillary action, evaporation and/or freezing. However, if the water reaching the lower transport layer is at a suction lower than the water entry suction of the lower transport layer, then it will enter the lower transport layer. When the lower transport layer contains enough water so that the unsaturated hydraulic conductivity of it significantly exceeds that of the lower soil body, water will flow downwardly.

A geocomposite capillary barrier drain consists of a transport layer overlying a different geosynthetic material that serves as the capillary barrier. Some geotextiles are likely to function as an effective transport layer, or they may be modified to perform this function (e.g., by dispersing fine granular material in them). For example, many geotextiles take on water under suction (negative water pressure) as indicated by a measurable capillary rise. Second, they exhibit the ability to effectively siphon water, that is, to transport water that is in a state of suction.

In addition to use in waste site cover systems, the barrier may also be used in pavement systems and to enhance stability of earth structures.

In the case of pavements, the presence of water at positive pressures in the base material beneath a pavement can lead to rutting, heaving and pavement failure. Drainage of water from beneath pavement before portions of the base saturate may significantly improve pavement longevity and performance.

In the case of earth structures, it may be desirable to promote unsaturated soil drainage to eliminate and/or reduce positive pore pressures and associated failures of some earth structures. Design procedures for problems of this type, such as embankments and retaining walls, often include provisions for drainage, but not until the soil has become saturated. Stability will be enhanced if drainage maintains negative water pressures in the soil, or if the location of saturated soil conditions is minimized.

It will be appreciated that a geotechnical structure has been described with a moisture barrier that limits moisture flow both downwardly and upwardly and drains unsaturated soil.

While the present invention has been described in connection with the preferred embodiments of the various elements, it is to be understood that other similar embodiments may be used or modifications and additions may be made to the present described embodiment for performing the same function of the present invention without deviating therefrom. Therefore, the present invention should not be limited to any single embodiment, but rather construed in breadth and scope in accordance with the recitation of the appended claims.

What is claimed is:

1. A geotechnical structure comprising:
    a first body of soil having a first concentration of moisture;
    a second body of soil having a second concentration of moisture wherein said first concentration of moisture is different from said second concentration of moisture; and
    an unsaturated moisture barrier interposed between the first body of soil and the second body of soil and said moisture barrier comprising a first layer adjacent the first body of soil, a second layer adjacent the second body of soil and a third medial moisture barrier layer, and said third medial moisture barrier layer is interposed between the first and second layer wherein the first layer is a lateral transport layer to transmit moisture from the first body of soil and has a first unsaturated hydraulic conductivity and the second layer is a lateral transport layer to transmit moisture from the second body of soil and has a second unsaturated hydraulic conductivity and the third layer is capillary barrier and has a third unsaturated hydraulic conductivity and said first and second unsaturated hydraulic conductivities are greater than said third unsaturated hydraulic conductivity, wherein there is a ground surface and the first body of soil is positioned between the first layer and the ground surface, and the second body of soil is superimposed over a water table.

2. The structure of claim 1 wherein the first layer of the barrier is superimposed over the second layer of the barrier.

3. The structure of claim 2 wherein the moisture barrier is at least partially positioned in a vertical plane and said moisture barrier drain has a slope in said vertical plane.

4. The structure of claim 3 wherein said slope is from about 1° to about 40°.

5. The structure of claim 3 wherein the shape of the moisture barrier is arcuate.

6. The structure of claim 1 wherein the moisture barrier layer has a lower end and a first drain is adjacent to said lower end and the first layer transports moisture from the first body of soil to said first drain.

7. The structure of claim 6 wherein the moisture barrier layer has a lower end and a second drain is adjacent to said lower end and the second layer transports moisture from the second body of water to said second drain.

8. The structure of claim 7 wherein the moisture barrier layer is arcuate in the vertical plane.

9. The structure of claim 1 wherein the moisture barrier has horizontally spaced first and second lower ends and there is at least one drain adjacent to each of said first and second lower ends.

10. The structure of claim 1 wherein the first concentration of moisture is below saturation levels.

11. The structure of claim 1 wherein the unsaturated hydraulic conductivity of the first layer is from about $1\times10^{-6}$ m sec$^{-1}$ to about $1\times10^{-2}$ m sec$^{-1}$.

12. The structure of claim 1 wherein the unsaturated hydraulic conductivity of the second layer is from about $1\times10^{-6}$ m sec$^{-1}$ to about $1\times10^{-2}$ m sec$^{-1}$.

13. The structure of claim 1 wherein the unsaturated hydraulic conductivity of the third layer is from about 0 to about $1\times10^{-6}$ m sec$^{-1}$.

14. The structure of claim 1 wherein the third layer has an entry suction head of from about −500 mm of water to about 500 mm of water.

15. The structure of claim 1 wherein the first layer and the second layer each have a thickness of from about 0.5 mm to about 50 mm.

16. The structure of claim 1 wherein the third layer has a thickness of from about 1 mm to about 100 mm.

17. The structure of claim 1 wherein the third moisture barrier layer is comprised of a first, second and third stratum and the first and second strata are geotextiles and the third stratum is comprised of a pored drainage means interposed between said first and second strata.

18. The structure of claim 1 wherein a body of buried waste is interposed between the second body of soil and the water table.

19. A geotechnical structure comprising:

a first body of soil having a first concentration of moisture;

a second body of soil having a second concentration of moisture wherein said first concentration of moisture is the same as said second concentration of moisture; and an unsaturated moisture barrier interposed between the first body of soil and the second body of soil and said moisture barrier comprising a first layer adjacent the first body of soil, a second layer adjacent the second body of soil and a third medial moisture barrier layer, and said third medial moisture barrier layer is interposed between the first and second layer wherein the first layer is a lateral transport layer to transmit moisture from the first body of soil and has a first unsaturated hydraulic conductivity and the second layer is a lateral transport layer to transmit moisture from the second body of soil and has a second unsaturated hydraulic conductivity and the third layer is a capillary barrier and has a third unsaturated hydraulic conductivity and said first and second unsaturated hydraulic conductivities are greater than said third unsaturated hydraulic conductivity, wherein there is a ground surface and the first body of soil is positioned between the first layer and the ground surface, and the second body of soil is superimposed over a body of buried waste and the second body of soil and the body of buried waste is superimposed over a water table.

20. The structure of claim 19 wherein the third moisture barrier layer is comprised of a first, second and third stratum and the first and second strata are geotextiles and the third stratum is comprised of a pored drainage means interposed between said first and second strata.

21. A geotechnical structure comprising:

a first body of soil;

a second body of soil; and an unsaturated moisture barrier interposed between the first body of soil and the second body of soil and said moisture barrier comprising a first layer adjacent the first body of soil, a second layer adjacent the second body of soil and a third medial moisture barrier layer, and said third medial moisture barrier layer is interposed between the first and second layer wherein the first layer is a lateral transport layer to transmit moisture from the first body of soil and the second layer is a lateral transport layer to transmit moisture from the second body of soil and third layer is a capillary barrier to prevent the moisture from being transmitted between said first and second layers wherein there is a ground surface and the first body of soil is positioned between the first layer and the ground surface, and the second body of soil is superimposed over a water table.

22. The structure of claim 21 wherein the third moisture barrier layer is comprised of a first, second and third stratum and the first and second strata are geotextiles and the third stratum is comprised of a pored drainage means interposed between said first and second strata.

23. The structure of claim 21 wherein a body of buried waste is interposed between the second body of soil and the water table.

* * * * *